Patented June 24, 1947

2,422,754

UNITED STATES PATENT OFFICE 2,422,754

PREPARATION OF POLYVINYL ACETAL RESINS

Gelu Stoeff Stamatoff, Rutherford, N. J., assignor to E. I. du Pont de Nemours & Company, Wilmington, Del., a corporation of Delaware No Drawing. Application March 13, 1943, Serial No. 479,055

11 Claims. (Cl. 260—73)

This invention relates to the preparation of polyvinyl acetal resins and, more particularly, to improvements in their manufacture on a commercial scale.

It is known that the products of hydrolysis of polyvinyl esters will react with aldehydes to form polyvinyl acetal resins. The characteristics of the resulting resins will depend, inter alia, upon the extent to which the initial polyvinyl ester has been hydrolyzed, upon the extent to which the resulting hydroxyl groups have been reacted with aldehyde, and upon the choice of the aldehyde used. In general the reaction of condensation is not complete and the polyvinyl acetal resin contains in its macromolecule both acetal groups and free hydroxyl groups, and, frequently, also unaltered ester groups. To meet the requirements of specific uses best, it is necessary to control the percentages of polyvinyl acetal and of polyvinyl alcohol in the final resin. Thus, if it is desired that the resin be soluble in a variety of organic solvents, the acetal content must be carried beyond a certain minimum since resins containing more than the corresponding proportion of unaltered polyvinyl alcohol will be insoluble in the desired solvents. If it be desired that the resin be substantially unaffected by water, a high content of acetal and a relatively low content of free hydroxyl groups are required.

Resins of different characteristics are required for different purposes. Thus, for use in interlayer for safety glass, the resin must not only possess the appropriate mechanical properties but also be compatible with useful plasticizers.

The procedures heretofore most favored for the commercial manufacture of polyvinyl acetal resins involve the use of organic solvents, and are of two general types. In the so-called one-stage procedure, a polyvinyl ester is acted upon by an aldehyde in the presence of an acid catalyst, and the hydrolysis of the ester and the formation of acetal proceed side by side. Sufficient of a suitable solvent is provided to keep the reaction product in solution throughout its formation. In the so-called two-stage procedure, a polyvinyl ester is hydrolyzed, either partially or completely, and the resulting product is condensed with an aldehyde in a separate subsequent step; the hydrolysis product may or may not be isolated before being reacted with aldehyde. In this procedure also sufficient suitable solvent is present so that at the close of the reaction the polyvinyl acetal resin is in solution. In either case, in order to obtain the product in a useful form, it must be separated from solution by precipitation, and subsequently purified.

It is known, also, that the condensation of polyvinyl alcohol with aldehyde may be carried out in an aqueous medium, by introducing an aldehyde and an acid catalyst into an aqueous solution of the polyvinyl alcohol. Obviously, it is more economical to conduct the manufacture thus without the use of organic solvent, but in actual practice condensation in aqueous medium has met with difficulties. If the reaction mixture is heated, the reaction of condensation proceeds only part way before a half-formed resin separates from solution in a coherent spongy mass, and the physical condition of this precipitate makes it difficult to effect the continuance of the reaction to the desired end-point, and also renders the purification of the final resin laborious and difficult. If, on the other hand, the reaction mixture is kept at a temperature so low that a resinous product is obtained in a desirably finely divided form, the reaction between polyvinyl alcohol and aldehyde does not proceed far enough to meet ordinary commercial requirements; the proportion of unaltered polyvinyl alcohol in the product is distinctly higher than the maximum which can be tolerated for most commercial purposes, and the resin is unsatisfactory in its solubilities and undesirably sensitive to water.

It is an object of the present invention to provide a commercially feasible process for the manufacture of polyvinyl acetal resins of commercially useful types without using organic solvent in connection with the reaction of condensation. A further object is to render unnecessary the difficult step of precipitating the finished resin from solution and, instead, to provide a method by which the resin is precipitated, in the course of its formation, in such physical form as to be conducive to the desired completion of the reaction of condensation, and to the subsequent purification of the resin. A further object is to effect economy in the use of aldehyde in the reaction of condensation.

A further object of the invention is the preparation of polyvinyl butyral resins of desired solubilities, compatibilities and mechanical and optical properties. A still further object of the invention is the provision of a continuous process for the manufacture of polyvinyl acetal resins. Other objects will appear from the description of the invention given hereinafter.

The above objects are accomplished according to the present invention through the preparation of polyvinyl acetal resins by adding polyvinyl alcohol in a preponderantly water solution, gradually and with agitation, to an aldehyde containing at least two carbon atoms, in the presence of an acid catalyst, at least 0.05 mols of aldehyde being present per 1.0 mol of polyvinyl alcohol added, (i. e., per vinyl alcohol (—$CH_2$—CHOH—) unit) the period during which said polyvinyl alcohol is gradually added, and the agitation given to the reactants being regulated so that the polyvinyl acetal resin formed is precipitated in a finely divided state. When amounts of 0.04 mol of aldehyde and less are used the resin formed agglomerates. From about 0.05 to 0.08 mols, however, divided particles that do not agglomerate are formed and which are coarser at the lower limit. At 0.08 mol, however, finely dispersed particles are first formed which also do not agglomerate but may take the form of coarser particles as the reaction proceeds.

The invention also comprises the preparation of a product not heretofore known, namely, a polyvinyl butyral resin having the constitution:

| | Per cent |
|---|---|
| Polyvinyl alcohol | 15 to 22 |
| Polyvinyl butyral | 85 to 77 |
| Polyvinyl acetate | Remainder | and being substantially soluble in acetone and insoluble in water.

The product of hydrolysis of a polyvinyl ester which comprises one of the starting materials, is herein referred to as "polyvinyl alcohol," but merely for the sake of simplicity. Actually, the "polyvinyl alcohols" used in the manufacture of polyvinyl acetal resins are commonly the products of an incomplete, rather than of a complete, hydrolysis of the polyvinyl ester (usually polyvinyl acetate), and thus contain, in their macromolecules, residues of unhydrolyzed vinyl acetate, in amounts up to as much as 30 per cent but more usually, at least if the resin is to be used in safety-glass interlayer, in amounts of the order of 0.5 to 6 per cent.

The term "polyvinyl acetal resin" is commonly applied generically to any product of the condensation of such a polyvinyl alcohol with any aldehyde in which more than a nominal proportion of the hydroxyl groups has been reacted to form acetal groups. To avoid confusion herein, a polyvinyl acetal resin resulting from condensation with acetaldehyde will be referred to as a polyvinyl acetal resin of acetaldehyde.

The procedural feature of the present invention is based upon the discovery that the physical form assumed by the resin, as it separates from the preponderantly aqueous vehicle, is decisively influenced by the manner in which the polyvinyl alcohol, in predominantly water solution, has been mixed with the aldehyde.

The addition of the polyvinyl alcohol solution to the aldehyde in accordance with the present invention may be carried out by either of two general procedures, namely:

(A) A quantity of the aldehyde is introduced into a reaction vessel and then the polyvinyl alcohol solution is gradually added with agitation. In this procedure, the aldehyde introduced into the reaction vessel must be sufficient so that there is always at least 0.05 and preferably at least 0.08 mol of aldehyde per 1.0 mol of polyvinyl alcohol (i. e., per vinyl alcohol (—CH$_2$—CHOH—) unit) introduced but any aldehyde in excess of that proportion may be introduced into the reaction vessel either before or after adding the polyvinyl alcohol solution.

(B) Simultaneously and at a slow rate the polyvinyl alcohol solution and the aldehyde are introduced into a reaction vessel in the proportion of at least 0.05 and preferably at least 0.08 mol of the aldehyde per 1.0 mol of polyvinyl alcohol (i. e., per vinyl alcohol (—CH$_2$—CHOH—) unit) and the reaction mixture subjected to vigorous agitation.

It has been observed that, quite unexpectedly, polyvinyl acetal resin prepared in accordance with the process of the present invention, is precipitated in a desirably finely divided condition, free from tendency to agglomerate. This is in direct contrast to the heretofore proposed methods of preparing a polyvinyl acetal resin in an aqueous reaction medium, which methods have been characterized in the production of a polyvinyl acetal resin precipitate in the condition of relatively coarse sticky particles which tend strongly to agglomerate and which are exceedingly difficult to handle and effectively treat in the subsequent steps of purification and stabilization.

An essential feature of the present process is the duration of the period during which the polyvinyl alcohol solution is added to the aldehyde. If the reactants are added all at once or over a very short period, the desired result of a finely divided precipitate free of tendency to agglomerate, will not be obtained. There is a minimum period, not subject to fine mathematical definition but readily determined approximately by preliminary testing, which must be observed in adding the polyvinyl alcohol solution to the aldehyde, in order to obtain the desired result, i. e., a polyvinyl acetal resin precipitated in a finely divided form free of tendency to agglomerate and adapted to be handled, readily and effectively in subsequent treatment of the resin.

As a possible explanation of the necessity of this minimum period for adding the polyvinyl alcohol solution to the aldehyde, the theory is advanced that a lack of uniformity in the progress of the reaction between the polyvinyl alcohol and aldehyde causes the polyvinyl acetal resin formed to precipitate in the desired physical state. That is, in the present process, the first of the polyvinyl alcohol which contacts the aldehyde, begins to react with the aldehyde before the last of the polyvinyl alcohol has been added and, hence, there is a disparity in the progress of the acetalization throughout the mixture which is thus made up of molecules of polyvinyl alcohol reacting with aldehyde while in the presence of other molecules of polyvinyl alcohol which have reacted with the aldehyde to a lesser extent.

Whether the above explanation is correct or not, it still remains that the minimum period for addition of the polyvinyl alcohol solution for any particular circumstances, can be determined accurately only by preliminary testing. This difficulty is, fortunately, much more theoretical than actual. In the first place, the process is entirely operative even though the minimum period is greatly exceeded, the only disadvatnage being in some loss of efficiency in the use of the apparatus involved. Secondly, the minimum period is in no instance very great, a thirty minute period being sufficient under any conditions likely to be encountered and a fifteen minute period usually being sufficient.

On a laboratory scale when the amount of polyvinyl alcohol solution is of the order of one liter of 10 to 15 percent concentration, containing 0.5 part of acid as sulfuric acid, as catalyst, per 100 parts of polyvinyl alcohol, and at a temperature of 25° C. to 75° C., it has been found that the minimum period for the gradual addition, by method (A) above to the reaction vessel containing butyraldehyde, need be only two minutes.

The above illustration wherein the minimum period for the addition of the polyvinyl alcohol solution was determined to be only two minutes, represents approximately the extreme limit on the minimum period on the lower side for any conditions and ordinarily a period of at least approximately ten minutes will be used for the introduction of the polyvinyl alcohol solution. Numerous specific examples will be given hereinafter to illustrate the periods found suitable under various conditions for the introduction of the polyvinyl alcohol and those skilled in the art will be able to determine readily the desirable period of introduction of the polyvinyl alcohol under particular conditions encountered. Usually, a trial will be made employing a period for the introduction of polyvinyl alcohol solution amply sufficient and such period will be successively shortened in subsequent trials until the polyvinyl acetal resin begins to be precipitated in an unsatisfactory physical state and a final period selected slightly greater than the last period tried, or until the period has been reduced to a point where further reduction would effect no material economy. In adding the polyvinyl alcohol solution, regardless of whether procedures (A) or (B) are employed, the rate of introduction should be uniform throughout the period employed to gain the maximum efficiency. The minimum period for adding the polyvinyl alcohol solution does not vary appreciably regardless of whether procedure (A) or procedure (B) is employed.

A second essential feature of the process of the present invention is the provision of adequate agitation in the reaction vessel in which the polyvinyl acetal resin is being formed. The obvious purpose of this agitation is to assist in effecting precipitation of the polyvinyl acetal resin in finely divided form. In general, moderate agitation is sufficient when procedure (A) is being employed but quite vigorous agitation is necessary when employing procedure (B). Also, the agitation should be more vigorous when the resin is precipitated in the presence of incidental amounts of organic solvent, when the temperature of the reaction batch is relatively high, and when the viscosity of the polyvinyl alcohol is relatively low. If the viscosity of the polyvinyl alcohol, as measured in 4 per cent solution in water at 20° C. is below 25 centipoises, it may be desirable to supplement the effect of agitation by adding to the batch a small amount of a substance such as gelatine, monomyristine, monostearine, or a fatty alcohol sulfate. The use of certain of such substances and other suitable dispersing agents including methyl cellulose, potato starch, alkali metal salts of monoalkyl sulfuric acid esters, e. g., the sodium sulfate of a mixture of normal primary aliphatic alcohols with lauryl alcohol predominating and containing lesser proportions of myristyl, stearyl and decyl alcohols, the sodium salt of a mixture of cetyl and stearyl sulfates; the long chain sulfonic acids and their alkali metal salts; tri-isopropyl beta-naphthylene sulfonic acid etc. in somewhat similar manner is disclosed and claimed in an application of S. C. Overbaugh, Serial No. 430,436, filed February 11, 1942, now issued as U. S. Patent 2,345,946, and assigned to the assignee of the present application.

In carrying out the present invention, the use of dispersing agents is not essential but merely desirable under certain circumstances to supplement the effect of agitation in preventing the agglomeration of the precipitate of polyvinyl acetal resin. And in the present process these agents, when used, need not be added at the start but can be added after the precipitate of resin has formed, provided that they are then added promptly enough to anticipate and prevent the agglomeration of the precipitate.

The equipment for carrying out procedure (A) of the present invention may conveniently comprise a reaction vessel provided with a cover and, preferably, with a reflux condenser. The vessel should be provided with means for stirring its contents and with means for controlling the temperature of the contents, the latter means usually comprising a jacket through which a heated liquid may be circulated. There should be provided an opening for the addition of the solution of polyvinyl alcohol which is preferably previously brought to the desired temperature. The reaction vessel should be provided, for convenient operation, with a bottom discharge opening for the withdrawal of its contents upon the completion of the reaction.

For carrying out procedure (B) of the present invention there may be conveniently used a mixing vessel into which enter the streams of the ingredients, and this should be provided with means for very vigorously agitating the mixture as fast as it is formed. Upon completion of the initial mixing of the streams of ingredients, agitation, not necessarily extremely vigorous, must be continued until the close of the reaction. As it may not be convenient to provide for the vigorous agitation of small quantities of liquid by means of the same equipment which will effectively agitate the ultimately larger quantity of the entire batch, it may be found desirable to effect the initial vigorous mixing together of the two streams of reactants in a relatively small piece of equipment from which the resulting mixture passes continuously into another vessel large enough to accommodate the entire batch and in which the subsequent completion of the reaction is effected.

As an alternate method of carrying out procedure (B), the reaction may be conducted from beginning to end in a continuous manner. To accomplish this, the reaction kettle may be replaced by a conduit of sufficient length to provide the necessary period of reaction before the slurry of resin is discharged from its far end. The initial commingling of the reactants is effected in continuous manner in a suitable mixing device of sufficient size so that the necessary disparity in progress of the reaction will be established and which discharges continuously into this conduit. During its passage through the conduit, the reaction mixture is kept in a state of agitation by appropriate means such as baffles or convolutions in the conduit and one or more pumps which insure the passage of the mixture at the desired rate. The rate at which the ingredients are commingled and at which the resulting mixture is passed through the conduit is correlated with the cross-section and length of the conduit so that the mixture remains in passage through the conduit for the time required for completion of the reaction. The conduit may be jacketed so that the temperature of its contents can be controlled.

As a variation of the continuous process, the conduit suggested above may be replaced by a plurality of small mixers in series which, together with their intermediate connections, form a continuous system of appropriate capacity.

Since it is difficult to dissolve polyvinyl alcohol in water at normal temperatures, it is convenient to prepare the water solution of polyvinyl alcohol by the use of warm water, for example, water at a temperature of at least 50° C. to 60° C.

Frequently it is convenient or economical to start with the polyvinyl alcohol wet with the organic solvent in which it has been prepared, e. g., methanol or acetic acid, or methyl acetate formed as a by-product of hydrolysis in methanol. The presence of such an organic solvent in an amount up to about 15 percent of the batch is not objectionable except when its tendency to cause agglomeration is supplemented by the use of high temperatures. Such an amount of organic solvent, of course, leaves the solution of polyvinyl alcohol still preponderently a water solution.

The concentration of the polyvinyl alcohol in its preponderantly water solution will usually be between about 10 per cent and 15 per cent, by weight, or slightly higher. Too dilute a solution is obviously uneconomical from the standpoint of yield from a given piece of equipment while, on the other hand, a solution must not be so concentrated as to be too viscous to be effectively agitated. The particular concentration of the polyvinyl alcohol solution is not critical.

As the catalyst for effecting the desired reaction of condensation, sulfuric acid is entirely satisfactory but other mineral acids may be used, such as hydrochloric and phosphoric acids, or organic acids such as benzene sulphonic and ethyl sulphonic acids, or formic acid, or other recognized catalysts of acidic character such as zinc chloride and calcium chloride. It is also quite satisfactory to use the acid which remains with the polyvinyl alcohol as a residue of the acid used in its production from polyvinyl acetate. When sulfuric acid has been so used, the residual acid retained by the polyvinyl alcohol is, perhaps, sulfuric acid or, perhaps, at least in part, methyl sulfuric acid.

Taking sulfuric acid as a typical and preferred catalyst, it is found desirable ordinarily to use not less than about 0.1 per cent and not more than about 2.5 per cent, based upon the weight of the polyvinyl alcohol, and more usually an amount between about 0.2 per cent and about 0.5 per cent is preferred. If the polyvinyl alcohol has been prepared by hydrolysis with the assistance of an acid, the residues of acid remaining in the polyvinyl alcohol are titrated as sulfuric acid and are counted as part of the content of catalyst for the reaction of condensation.

Most conveniently, the catalyst will be contained in the solution of polyvinyl alcohol prior to the mixing of the latter with the aldehyde although this is not essential so long as the catalyst is present from the start of the mixing period. Thus, in procedure (B) of the present invention, it is entirely feasible to introduce an aqueous solution of catalyst into a vessel provided with means for agitating its contents and then to introduce streams of aldehyde and of water solution of polyvinyl alcohol, neither of which contain any catalyst or which contain only an inadequate quantity of catalyst.

The physical characteristics of the aldehyde used will determine the manner in which it will be introduced. Liquid aldehydes of limited solubility in water, such as butyraldehyde, may be introduced in the form of an emulsion in water but this is not necessary and it is preferred merely to run in such liquid aldehyde by itself since the agitation which it encounters, insures its thorough distribution in the relatively larger volume of the water solution of polyvinyl alcohol. Polymeric aldehydes, liquid or solid, may be used under such conditions as will cause their decomposition into the reactive monomeric aldehyde.

The temperature of the solution of polyvinyl alcohol, when it is mixed with the aldehyde, may be selected between about 25° C. and about 90° C. in accordance with the present invention. The temperature maintained during the period of reaction subsequent to the mixing together of the reactants is desirably between 40° C. and 90° C. The temperature must not be so high as to cause agglomeration of the polyvinyl acetal resin being precipitated. Normally, the precipitate is formed in fine particles which do not tend to agglomerate but this highly desirable condition and behavior of the particles can be spoiled by the use of too high a temperature and, also, by the presence in the reaction batch of too much of any organic liquid having a solvent action on the precipitate. For this reason the reaction in accordance with the present invention is carried out in a preponderantly water medium. It will be apparent that a combination of the presence of organic solvent and the use of an undesirably high temperature will effect agglomeration of the precipitate more readily than will either of these factors alone in the absence of the other.

It has been discovered, unexpectedly, that the temperature under which the reaction of condensation is carried out according to the present invention, has a determining influence upon the character of a butyral resin produced, independently of its content, as demonstrated by analysis, of polyvinyl ester, polyvinyl alcohol and polyvinyl butyral which content is governed by the extent of the hydrolysis of the initial polyvinyl ester, usually polyvinyl acetate, and the extent of the reaction of condensation.

Heretofore, in resins of low content of polyvinyl acetate made by condensation conducted in organic solvents, solubility of the resin in acetone has been observed only when the content of polyvinyl alcohol is below 15 per cent, by weight, of the whole. But following the process of the present invention and provided that the temperature prevailing during the steps of mixing together the ingredients and of thereafter completing the reaction is not allowed to exceed about 60°–65° C. (i. e., if it is maintained between 40° C. and 60°–65° C.), and provided that an appropriate proportion of butyraldehyde is furnished, there is obtained a polyvinyl butyral resin which, upon analysis by standard method, is found to contain, by weight:

| | Per cent |
|---|---|
| Polyvinyl alcohol | 15 to 22 |
| Polyvinyl acetal | 85 to 77 |
| Polyvinyl ester | Remainder | and is substantially completely soluble in acetone. Such polyvinyl butyral resin is believed to be unknown heretofore. The solubility of a resin of this type in acetone makes it particularly useful as a constituent of adhesive solutions. On the other hand, such a resin is not desirable for use in safety-glass interlayers.

This acetone-soluble polyvinyl butyral resin is, however, susceptible to being converted into an acetone-insoluble modification which is desirable for use in safety-glass interlayers, by heating the resin in the presence of acid to a temperature of 65° C. to 95° C., as set forth in detail in United States Patent 2,358,355, granted Sept. 19, 1944, to the present applicant and entitled "Treatment of polyvinyl butyral resins."

An acetone-insoluble resin, whose constitution, as indicated by analysis, may fall within the range just mentioned for the acetone-soluble resin, is formed by the process of the present invention provided that the proportion of butyraldehyde furnished is adequate and provided also that the temperature prevailing during the reaction of condensation be maintained above about 65° C., and preferably between 75° C. and 95° C.

The following examples in which all proportions are given by weight unless otherwise stated, illustrate specific embodiments of the present invention. Except where otherwise specified, the polyvinyl alcohols used contain between about 0.5% and 2.0% of unhydrolyzed polyvinyl acetate and have viscosities between about 50 and 75 centipoises.

Example I

Into a 2-liter flask, fitted with a reflux condenser and an effective mechanical agitator, is placed butyraldehyde, 31 grams. With the agitator in motion, there is now introduced slowly into the flask 1000 grams of a 10% water solution of polyvinyl alcohol, containing 0.4 gram of sulfuric acid, at 75° C. The time required for this addition is fifteen minutes, and the temperature of the mixture at the end of this time is 65° C. There is then added to the mixture another portion of butyraldehyde, 31 grams. The mixing is continued, and the temperature held at 50°–55° C.

Within a few minutes a resin separates in finely dispersed particles and then gradually takes the form of coarser, filterable, particles. After a total time of forty minutes, the resin is separated, washed and stabilized by conventional procedure. The particles are coarse enough to be separated readily, but fine enough to be effectively washed and stabilized. The resin is soluble in acetone.

Substantially identical results are obtained by following this same procedure except that all of the butyraldehyde is initially placed in the reaction flask. Likewise, the same results are obtained when only 17 grams of butyraldehyde (amounting to about 0.1 mols of butyraldehyde per mol of polyvinyl alcohol added) are initially placed in the reaction flask and the remainder added after the polyvinyl alcohol has been introduced.

Again, following the procedure above but only initially placing 8 grams of butyraldehyde (amounting to about 0.05 mols per mol of polyvinyl alcohol added) in the reaction flask and adding the remainder after the polyvinyl alcohol has been introduced, the resulting precipitate is coarser than that obtained by the first two procedures hereof but does not agglomerate.

On the other hand, following the exact procedure above except that the polyvinyl alcohol solution is all added within a period of forty seconds, the dispersed particles of precipitated resin agglomerate in gross masses and cannot be effectively washed and stabilized.

Example II

The ingredients and procedure are as in Example I, except that all of the butyraldahyde is intially introduced into the reaction flask, the temperature of the solution of polyvinyl alcohol is 25° C., and the addition of the polyvinyl alcohol solution consumes fifteen minutes. About twenty minutes thereafter the mixture becomes clouded by the separation of a very finely divided precipitate. The mixture is then heated to 70° C. After about 60 minutes longer, the resin is separated, washed and stabilized. Its particle size is now neither too small nor too large. It is insoluble in acetone.

Example III

Procedure as in Example I, i. e., one-half of the aldehyde put into the vessel initially and one-half after the gradual addition of the polyvinyl alcohol, but aldehydes used as follows:

| | Grams |
|---|---|
| Isobutyraldehyde | 62 |
| Propionaldehyde | 50 |
| Benzaldehyde | 91 |

In each instance a satisfactory precipitate is obtained.

Example IV

Polyvinyl alcohol, 100 parts, carrying residues of 57.5 parts of methanol and 0.3 part of acid as sulfuric acid, is dissolved in 840 parts of water, containing 2.1 parts of sulfuric acid, by being stirred therewith at 90° C. The resulting solution is cooled to 47° C. The total weight of the resulting solution is 1000 parts.

For condensation with this polyvinyl alcohol there is used 95% butyraldehyde, 68.5 parts.

These two liquids are brought together in proportional increments by being introduced simultaneously into a mixing vessel at uniform rates proportional to the respective totals of the two, i. e., at rates of 40 parts and 2.75 parts per minute, respectively.

The mixing vessel is provided with an agitator which is kept in rapid motion during the addition of the reactants. The resulting mixture passes continuously from the mixing vessel to a condensation kettle.

The mixing of the ingredients consumes twenty-five minutes. During and following this mixing, a resinous precipitate separates in finely divided form.

The complete mixture is vigorously agitated in the condensation kettle, maintained at 50° C., for one hour longer, to bring the reaction to the desired end-point. The reaction batch is then cooled and the polyvinyl butyral resin, which retains the previously developed finely divided form, is separated from the liquid and purified in known manner.

By analysis, this resin is found to contain:

| | Per cent |
|---|---|
| Polyvinyl acetate (unhydrolyzed residue) | 1.0 |
| Polyvinyl alcohol (unreacted residue) | 18.5 |
| Polyvinyl butyral | 80.5 |

This demonstrates the consumption of 59 parts of the 65 parts of butyraldehyde supplied, or 90.7%.

The resin is soluble in acetone.

Example V

Ingredients are as follows:

| | Parts |
|---|---|
| Polyvinyl alcohol | 100. |
| Methanol residue | 87.5 |
| Acid residue (as sulfuric) | 0.38 |
| Sulfuric acid | 1.88 |
| Water | 707. |
| | 896.8 |
| Butyraldehyde | 74.5 |

The procedure is as in Example IV, the time consumed in commingling the two liquids being nineteen minutes and in the condensation reaction one hour at 45°–50° C.

By analysis, the resulting resin contains:

| | Per cent |
|---|---|
| Polyvinyl acetate | 1.0 |
| Polyvinyl alcohol | 21.1 |
| Polyvinyl butyral | 77.9 |

It is soluble in acetone.

Example VI

Ingredients are as follows:

| | Parts |
|---|---|
| Polyvinyl alcohol | 100. |
| Methanol residue | 75.2 |
| Acid residue (as sulfuric) | 0.35 |
| Sulfuric acid | 2.34 |
| Water | 760. |
| | 938. |
| Butyraldehyde | 86.4 |

The procedure is as in Example IV, the commingling of the two liquids consuming sixteen minutes, and the condensation, at 48° C, requiring one hour.

By analysis, the resulting resin contains:

| | Per cent |
|---|---|
| Polyvinyl acetate | 1.0 |
| Polyvinyl alcohol | 13.2 |
| Polyvinyl butyral | 85.8 |

It is soluble in acetone.

Example V and VI illustrate the process of the present invention carried out on a semi-works scale.

Example VII

For this example, which represents operation on a plant scale, weights are given in pounds, with parts per 100 parts of polyvinyl alcohol in parentheses.

Polyvinyl alcohol, 600 pounds (100), carrying residues of methanol, 640 pounds (107) and of sulfuric acid, 1.8 pounds (0.3), is dissolved in 4920 pounds (820) of water, containing sulfuric acid, 10.2 pounds (1.7), by being stirred therewith at 90° C.

For condensation therewith there is used butyraldehyde (96%) 407 pounds (68).

For intensively mixing together the reactants there is used a vessel of capacity 25 gallons, provided with a double-bladed agitator. This connects with a reaction kettle of capacity 1500 gallons, provided with an agitator.

Into the reaction kettle is introduced 250 gallons (348) of water, at 60°–65° C., and the jacket of the kettle is heated to maintain this temperature throughout the reaction.

The aqueous solution of polyvinyl alcohol is cooled to 65° C. and is introduced into the mixing vessel at a steady rate of 3.43 pounds per second. Simultaneously, the butyraldehyde is introduced into the mixing vessel at a steady rate of 0.226 pound per second. The resulting mixture passes into the reaction kettle, in which the agitator is in motion. The commingling of the reactants consumes thirty minutes. The mixture remains in the kettle, under agitation, for sixty minutes thereafter, for the completion of the reaction.

The batch is now cooled, and a finely-divided resin is separated from the liquid, and purified in known manner. By analysis, this resin is found to contain:

| | Per cent |
|---|---|
| Polyvinyl acetate | 1.0 |
| Polyvinyl alcohol | 15.0 |
| Polyvinyl butyral | 84.0 |

This demonstrates the consumption of 62.5 parts of the 65.3 parts of butyraldehyde supplied, of 96%.

Example VIII

Unneutralized, methanol-wet polyvinyl alcohol, 40.5 pounds, containing polyvinyl alcohol (dry weight), 23.0 pounds, methanol, 17.5 pounds, and acid (as sulfuric), 0.08 pound, is dissolved in water, 172 pounds, at 70° C. The resulting solution is run into a vessel at a steady rate, and at the same time there is introduced into the vessel, also at a steady rate, butyraldehyde, 7.2 pounds, or approximately 0.19 mol per mol of polyvinyl alcohol. The thorough commingling of the two streams is insured by the rapid motion of an agitator in the vessel. The resulting mixture, at a temperature of 65°–70°., passes into a condensation kettle provided with an anchor agitator and previously loaded with 35 pounds of water to improve the effectiveness of the agitator. A period of twenty to twenty-five minutes is occupied with the commingling of the ingredients. The temperature of the mixture in the condensation kettle is now 60°–65° C. To this mixture is now added a further quantity (7.2 pounds) of butyraldehyde, and the mixture is heated, in about twenty-five minutes, to 85° C. and then maintained at 85° C. for one hour. The agitator is in motion from beginning to end of the process.

The resulting resin, suspended in small and non-agglomerating particles in the reaction mixture, is stabilized by the addition, to the mixture, of aqueous sodium hydroxide until 100 ml. of the liquor will require 30–30 ml. of 0.01 N hydrochloric acid for titration to neutrality (with bromthymol blue as indicator) and by further heating at 80°–85° C. for forty-five minutes. The resin is now separated, washed three times with water, and dried.

The finished resin contains:

| | Per cent |
|---|---|
| Polyvinyl acetate | 1.0 |
| Polyvinyl alcohol | 19.7 |
| Polyvinyl butyral | 79.3 |

Example IX

The procedure is the same as in the preceding example, except that the amount of butyraldehyde used is 0.48 mol per mol of polyvinyl alcohol; half of the aldehyde is commingled with all of the polyvinyl alcohol by simultaneous introduction of the two at such rates as to consume twenty to twenty-five minutes, and then the balance of the aldehyde is introduced. The finished resin contains:

| | Per cent |
|---|---|
| Polyvinyl acetate | 1.0 |
| Polyvinyl alcohol | 13.2 |
| Polyvinyl butyral | 85.8 |

Example X

Polyvinyl alcohol, 610 pounds (dry weight), containing acid, 2.135 pounds (as sulfuric) and wet with methanol (440 pounds), is dissolved in water, 4100 pounds, at 73° C.

The aldehyde used initially is butyraldehyde, of 98% purity, 192 pounds, i. e., about 0.19 mol per mol of polyvinyl alcohol.

The two liquids are run in steady streams into a 25-gallon vessel in which an effective agitator is in rapid motion and which overflows into a second similar vessel, which in turn overflows into a kettle. The kettle contains initially 125 gallons of water at 50° C., which serves to insure effective functioning of an agitator, which is kept in motion from the start.

The rates of addition of the reacting liquids are such that their commingling in this manner requires twenty-five minutes.

The temperature of the mixture leaving the first mixing vessel is 69° C. and in the kettle 65° C.

There is now added, to the mixture in the kettle, butyraldehyde, 180 pounds, and the mixture is heated to 88° C. within one hour and then held at 88° C. for one hour.

There is now added sodium hydroxide, 10 pounds, in water, and the mixture is stirred, without further application of heat, for one hour. The resin is now drained, washed four times with water, and dried.

It contains:

| | Per cent |
|---|---|
| Polyvinyl acetate | 0.85 |
| Polyvinyl alcohol | 19.50 |
| Polyvinyl butyral | 79.65 |

This resin is insoluble in acetone, and suitable for use in safety-glass interlayer.

Example XI

Polyvinyl alcohol, 100 parts, carrying residues of 61.9 parts of methanol and 0.5 part of sulfuric acid, is dissolved in 831 parts of water, containing 1.62 parts of sulfuric acid, by being stirred therewith at 90° C. The resulting solution is cooled to 55° C. The total weight of the resulting solution is 995 parts.

For condensation with this polyvinyl alcohol there is used isobutyraldehyde, 81 parts.

These two liquids are brought together in proportional increments by being introduced simultaneously into a reaction vessel at uniform rates proportional to the respective totals of the two, i. e., at rates of 100 parts and 8.15 parts per minute, respectively.

The reaction vessel already contains 486 parts of water, at 50° C., and 0.54 part of sulfuric acid, and is provided with an agitator which is maintained in rapid motion during the addition of the reactants.

The mixing of the ingredients therein consumes 9.9 minutes. During the mixing, a resinous precipitate, the product of reaction of part of the aldehyde with part of the polyvinyl alcohol, separates in finely divided form.

The complete mixture is vigorously agitated in the vessel, maintained at 50°–60° C. for one hour longer, to bring the reaction to the desired end-point. The reaction batch is then cooled, and the polyvinyl isobutyral resin, which retains the previously developed finely-divided form, is separated from the liquid, and purified in known manner.

Example XII

The equipment, procedure and ingredients are the same as in Example XI, except that instead of isobutyraldehyde, 81 parts, there is used paraldehyde, 54 parts, introduced at the rate of 5.43 parts per minute, and that, after the mixing of the reactants has been completed, the reaction is continued at 70° C. for ninety minutes.

The resulting resin contains:

| | Per cent |
|---|---|
| Polyvinyl acetate | 1.0 |
| Polyvinyl alcohol | 20.3 |
| Polyvinyl acetal of acetaldehyde | 78.7 |

This demonstrates the consumption of 37 parts of the 54 parts of paraldehyde supplied, or 69%.

Example XIII

The equipment, procedure and ingredients are the same as in Example XI, except that the amount of sulfuric acid added is 5.4 parts and that instead of isobutyraldehyde, 81 parts, there is used freshly distilled acetaldehyde, 54 parts, introduced at the rate of 5.43 parts per minute.

The resulting resin contains:

| | Per cent |
|---|---|
| Polyvinyl acetate | 1.0 |
| Polyvinyl alcohol | 18.7 |
| Polyvinyl acetal of acetaldehyde | 80.3 |

This demonstrates the consumption of 38 parts of the 54 parts of acetaldehyde supplied, or 70.5%.

Example XIV

Polyvinyl alcohol, 100 parts, carrying residues of 66.7 parts of methanol and 0.5 part of sulfuric acid, is dissolved in 951 parts of water, containing 3.33 parts of sulfuric acid, by being stirred therewith at 90° C. The resulting solution is cooled to 55° C. The total weight of the resulting solution is 1121 parts.

For condensation with this polyvinyl alcohol there is used 2, 4-dimethyl pentanal, 108.5 parts.

These two liquids are brought together in proportional increments by being introduced simultaneously into a mixing vessel at uniform rates proportional to the respective totals of the two, i. e., at rates of 75 parts and 7.25 parts per minute, respectively. The mixture is vigorously stirred as it is formed.

The mixing of the ingredients consumes fifteen minutes. During the mixing, a resinous precipitate, the product of reaction of part of the aldehyde with part of the polyvinyl alcohol, separates in finely divided form.

The complete mixture is thereafter vigorously agitated at 50°–60° C. for ninety minutes longer, to bring the reaction to the desired end-point. The reaction batch is then cooled, and the polyvinyl 2, 4-dimethyl pentanal resin, which retains the previously developed finely divided form, is separated from the liquid, and purified in known manner.

This resin contains:

| | Per cent |
|---|---|
| Polyvinyl acetate | 1.0 |
| Polyvinyl alcohol | 18.2 |
| Polyvinyl 2, 4-dimethyl pentanal | 80.8 |

This demonstrates the consumption of 87 parts of the 108.5 parts of the aldehyde supplied, or 81%.

Example XV

The ingredients and procedure are the same as those of Example XIV, except that instead of 2, 4-dimethyl pentanal, 108.5 parts, there is used 2-methyl pentanal, 93.3 parts, which is introduced at the rate of 6.25 parts per minute.

The resulting resin contains:

| | Per cent |
|---|---|
| Polyvinyl acetate | 1.0 |
| Polyvinyl alcohol | 36.7 |
| Polyvinyl 2-methyl pentanal | 62.3 |

This demonstrates the consumption of 62.6 parts of the 93.3 parts of the aldehyde supplied, or 56.6%.

Example XVI

Into a small kettle provided with an effective agitator in rapid motion and containing water, 10 pounds, at 60°–65° C., are run simultaneously (a) 25 pounds of a 10% water solution of polyvinyl alcohol, containing 0.05% of acid as sulfuric acid, and (b) 1.35 pounds of benzaldehyde (about 0.225 mol per mol of polyvinyl alcohol). This commingling consumes fifteen minutes. There is then added an equal amount of benzaldehyde. The mixture is heated to 85° C. within fifteen to twenty minutes and held at 85° C. for one hour. The mixture is cooled, and the resin drained and then washed four times with water, and then with 50% methanol to remove unreacted benzaldehyde. It is then stabilized, washed and dried, and shows by analysis:

| | Per cent |
|---|---|
| Polyvinyl acetate | 0.5 |
| Polyvinyl alcohol | 20.0 |
| Polyvinyl benzal | 79.5 |

Example XVII

Into a vessel like that of the preceding example, and containing 8 pounds of water, are run simultaneously (a) 30 pounds of 10% solution of polyvinyl alcohol in a mixture of water and methanol, 9:1, containing 0.06 pound of acid as sulfuric, and (b) a mixture of benzaldehyde, 0.6 pound, and propionaldehyde, 1.6 pound, constituting, together, 0.49 mol of aldehyde per mol of polyvinyl alcohol. The resulting mixture is heated at 60°–65° C. for one hour. The resin, which precipitates in desirable physical form, is stabilized, washed and dried, and yields on analysis:

| | Per cent |
|---|---|
| Polyvinyl acetate | 0.5 |
| Polyvinyl alcohol | 20.5 |
| Polyvinyl benzal-propional | 79.0 |

Example XVIII

Into a vessel like that in Example XVI, and containing 10 pounds of water, are run simultaneously (a) 25 pounds of a 10% water solution of polyvinyl alcohol containing 0.01 pound of sulfuric acid and (b) 0.815 pound of propionaldehyde (0.25 mol per mol of polyvinyl alcohol). This commingling consumes sixteen minutes. Then another 0.815 pound of propionaldehyde is added. Up to this point the temperature of the material has been 35°–38° C. The mixture is now heated, reaching 85° C. in twenty minutes, and is held at that temperature for one hour. Then sodium hydroxide, in water, is added to bring the pH to 7–8 and the mixture is held at 85° C. for thirty minutes. The mixture is then cooled, and the resin separated, washed and dried. The resin contains:

| | Per cent |
|---|---|
| Polyvinyl acetate | 1.0 |
| Polyvinyl alcohol | 20.9 |
| Polyvinyl propional | 78.1 |

Example XIX

Polyvinyl alcohol of viscosity 20–25 centipoises, 28.0 pounds, containing residues of methanol, 24.0 pounds, and of acid, 0.15 pound as sulfuric acid, is dissolved in water, 231 pounds, at 70° C. To the resulting solution is added gelatine, 0.14 pound, previously dissolved in a little water. This solution and 23.2 pounds of butyraldehyde are commingled in the manner of Example XI, at a rate which requires twenty-eight minutes for a completion. The commingled liquid passes into a kettle containing 140 pounds of water at 65° C. and the resulting mixture in the kettle is maintained at 60°–65° C. for ninety minutes. The precipitated resin is then washed and stabilized. It contains:

| | Per cent |
|---|---|
| Polyvinyl acetate | 1.0 |
| Polyvinyl alcohol | 11.5 |
| Polyvinyl butyral | 87.5 | and is soluble in acetone, toluene or ethanol.

It will be understood that the above examples are merely illustrative. Broadly considered, the process of the present invention comprises the reaction of polyvinyl alcohol in preponderantly water solution with aldehydes generally, excluding formaldehyde, in the presence of an acid catalyst, it being provided that at least 0.05 and preferably at least 0.08 mol of the aldehyde is present per 1.0 mol of polyvinyl alcohol and the period of adding the polyvinyl alcohol solution and the agitation of the reaction mixture being carried out as hereinbefore described.

As shown by the examples, the invention is particularly directed to reacting polyvinyl alcohol with benzaldehyde and the various saturated aliphatic aldehydes of the formula $C_nH_{2n}O$ wherein $n$ is an integer from 2 to 7, inclusive.

The invention further comprises, as a new composition, an acetone-soluble polyvinyl butyral resin containing:

| | Per cent |
|---|---|
| Polyvinyl alcohol | 15 to 22 |
| Polyvinyl butyral | 85 to 77 |
| Polyvinyl ester | Remainder |

In view of the ample number of specific examples illustrating widely varying specific embodiments of the invention, together with the discussion given hereinbefore of the factors that must be observed in carrying out the invention, those skilled in the art will be able to determine readily the optimum conditions for carrying out the present invention to obtain the precipitate of polyvinyl acetal resin in a physical state favorably adapted for efficient and economical subsequent handling and treatment of the resin.

The invention herein described provides a commercially feasible technique, suitable for either batch or continuous operation, for the manufacture of acetal resins of commercially useful types without the need of using organic solvent in the reaction of condensation. The invention has the further advantage of involving no step of precipitating the final product from solution; instead, the resin is precipitated, in the course of its formation, in a desirable finely-divided form which is conducive to its subsequent thorough purification by known methods. The invention further provides for the reaction of available hydroxyl groups with aldehyde to any extent required for commercial acceptability of the finished acetal resin, and accomplishes this with notable economy in aldehyde. In all those respects, therefore, the technique of the invention is an economical one.

As many apparently widely different embodiments of this invention may be made without departing from the spirit and scope thereof, it is to be understood that the invention is not limited to the specific embodiments thereof except as defined in the appended claims.

This application is a continuation-in-part of applicant's copending application Serial No. 430,437, filed February 11, 1942.

I claim:

1. Process of preparing a polyvinyl butyral resin which comprises adding polyvinyl alcohol in a preponderantly water solution at a temperature of 25° C.–90° C., gradually over a period of at least 2 minutes and with agitation, to butyraldehyde in the presence of an acid catalyst, at least 0.05 mol of butyraldehyde being present per 1.0 mol of polyvinyl alcohol added, the period during which said polyvinyl alcohol is gradually added, and the agitation given to the reactants being regulated so that the polyvinyl butyral resin formed is precipitated in a finely divided state substantially free of tendency to agglomerate and, thereafter, maintaining the reaction mixture under agitation and at a temperature of 40° C.–90° C. until the reaction of condensation between said polyvinyl alcohol and said butyraldehyde has proceeded to the desired end-point.

2. Process of preparing a polyvinyl butyral resin which comprises adding polyvinyl alcohol in a preponderantly water solution at a temperature of 25° C.–65° C., gradually over a period of at least 2 minutes and with agitation, to butyraldehyde in the presence of catalytic amounts of sulfuric acid, at least 0.08 mol of butyraldehyde being present per 1.0 mol of polyvinyl alcohol added, the period during which said polyvinyl alcohol is gradually added, and the agitation given to the reactants being regulated so that the polyvinyl butyral resin formed is precipitated in a finely divided state substantially free of tendency to agglomerate, and, thereafter, maintaining the reaction mixture under agitation and at a temperature of 40° C.–65° C. until the reaction of condensation between said polyvinyl alcohol and said butyraldehyde has proceeded to the desired end-point.

3. Process of preparing a polyvinyl butyral resin which comprises introducing into a reaction vessel a quantity of butyraldehyde, then adding thereto gradually over a period of at least 2 minutes and with agitation, in the presence of an acid catalyst, polyvinyl alcohol in a preponderantly water solution, at least 0.08 mol of butyraldehyde being present per 1.0 mol of polyvinyl alcohol added, the period during which said polyvinyl alcohol is gradually added and the agitation given to the reactants being regulated so that the polyvinyl butyral resin formed is precipitated in a finely divided state substantially free of tendency to agglomerate, and, thereafter, maintaining the reaction mixture under agitation until the reaction of condensation between said polyvinyl alcohol and said butyraldehyde has proceeded to the desired end-point.

4. Process of preparing a polyvinyl butyral resin which comprises introducing into a reaction vessel a quantity of butyraldehyde, then adding thereto gradually over a period of at least 2 minutes and with agitation polyvinyl alcohol in a preponderantly water solution containing catalytic amounts of sulfuric acid, said solution being at a temperature of 25° C.–90° C. and at least 0.08 mol of butyraldehyde being present per 1.0 mol of polyvinyl alcohol added, the period during which said polyvinyl alcohol is gradually added and the agitation given to the reactants being regulated so that the polyvinyl butyral resin formed is precipitated in a finely divided state substantially free of tendency to agglomerate, and, thereafter, maintaining the reaction mixture under agitation and at a temperature of 40° C.–90° C. until the reaction of condensation between said polyvinyl alcohol and said butyraldehyde has proceeded to the desired end-point.

5. Process of preparing a polyvinyl butyral resin which comprises simultaneously and gradually introducing into a reaction vessel over a period of at least two minutes, in proportionate increments and under vigorous agitation, polyvinyl alcohol in a preponderantly water solution at a temperature of 25° C.–90° C. and butyraldehyde in the proportion of at least 0.08 mol of butyraldehyde per 1.0 mol of polyvinyl alcohol, in the presence of an acid catalyst, the period during which the reactants are gradually introduced into said reaction vessel, and the agitation given to the reactants being regulated so that the polyvinyl butyral resin formed is precipitated in a finely divided state substantially free of tendency to agglomerate and, thereafter, maintaining the reaction mixture under agitation and at a temperature of 40° C.–90° C. until the reaction of condensation between said polyvinyl alcohol and said butyraldehyde has proceeded to the desired end-point.

6. Process of preparing a polyvinyl acetal resin which comprises adding polyvinyl alcohol in a preponderantly water solution at a temperature of 25° C.–90° C., gradually over a period of at least two minutes and with agitation, to an aldehyde from the group consisting of benzaldehyde and saturated aliphatic aldehydes of the formula $C_nH_{2n}O$ wherein $n$ is an integer from 2 to 7, inclusive, in the presence of an acid catalyst, at least 0.05 mol of aldehyde being present per 1.0 mol of polyvinyl alcohol added, the period during which said polyvinyl alcohol is gradually added, and the agitation given to the reactants being regulated so that the polyvinyl acetal resin formed is precipitated in a finely divided state substantially free of tendency to agglomerate, and, thereafter, maintaining the reaction mixture under agitation and at a temperature of 40° C.–90° C. until the reaction of condensation between said polyvinyl alcohol and said aldehyde has proceeded to the desired end-point.

7. Process of preparing a polyvinyl acetal resin which comprises simultaneously and gradually introducing into a reaction vessel over a period of at least two minutes, in proportionate increments and under vigorous agitation, polyvinyl alcohol in a preponderantly water solution at a temperature of 25° C.–90° C. and an aldehyde from the group consisting of benzaldehyde and saturated aliphatic aldehydes of the formula $C_nH_{2n}O$ wherein $n$ is an integer from 2 to 7, inclusive, in the proportion of at least 0.08 mol of aldehyde per 1.0 mol of polyvinyl alcohol, in the presence of an acid catalyst, the period during which the reactants are gradually introduced into said reaction vessel, and the agitation given to the reactants being regulated so that the polyvinyl acetal resin formed is precipitated in a finely divided state substantially free of tendency to agglomerate, and, thereafter, maintaining the reaction mixture under agitation and at a temperature of 40° C.–90° C. until the reaction of condensation between said polyvinyl alcohol and said aldehyde has proceeded to the desired end-point.

8. Process of preparing a polyvinyl acetal resin which comprises introducing into a reaction vessel a quantity of an aldehyde from the group consisting of benzaldehyde and saturated aliphatic aldehydes of the formula $C_nH_{2n}O$ wherein $n$ is an integer from 2 to 7, inclusive, then adding thereto gradually over a period of at least two minutes and with agitation, in the presence of an acid catalyst, polyvinyl alcohol in a preponderantly water solution, at least 0.08 mol of aldehyde being present per 1.0 mol of polyvinyl alcohol added, the period during which said polyvinyl alcohol is gradually added and the agitation given to the reactants being regulated so that the polyvinyl acetal resin formed is precipitated in a finely divided state substantially free of tendency to agglomerate, and, thereafter maintaining the reaction mixture under agitation until the reaction of condensation between said polyvinyl alcohol and said aldehyde has proceeded to the desired end-point.

9. Process of preparing a polyvinyl acetal resin which comprises introducing into a reaction vessel a quantity of an aldehyde from the group consisting of benzaldehyde and saturated aliphatic aldehydes of the formula $C_nH_{2n}O$ wherein $n$ is an integer from 2 to 7, inclusive, then adding thereto gradually over a period of at least two minutes and with agitation, in the presence of an acid catalyst, polyvinyl alcohol in a preponderantly water solution, said solution being at a temperature of 25° C.–90° C. and at least 0.08 mol of aldehyde being present per 1.0 mol of polyvinyl alcohol added, the period during which said polyvinyl alcohol is gradually added, and the agitation given to the reactants being regulated so that the polyvinyl acetal resin formed is precipitated in a finely divided state substantially free of tendency to agglomerate, and, thereafter, maintaining the reaction mixture under agitation and at a temperature of 40° C.–90° C. until the reaction of condensation between said polyvinyl alcohol and said aldehyde has proceeded to the desired end-point.

10. Process of preparing a polyvinyl acetal resin which comprises introducing into a reaction vessel a quantity of an aldehyde from the group consisting of benzaldehyde and saturated aliphatic aldehydes of the formula $C_nH_{2n}O$ wherein $n$ is an integer from 2 to 7, inclusive, then adding thereto gradually over a period of at least two minutes and with agitation polyvinyl alcohol in a preponderantly water solution containing catalytic amounts of sulfuric acid, said solution being at a temperature of 25° C.–90° C. and at least 0.08 mol of aldehyde being present per 1.0 mol of polyvinyl alcohol added, the period during which said polyvinyl alcohol is gradually added, and the agitation given to the reactants being regulated so that the polyvinyl acetal resin formed is precipitated in a finely divided state substantially free of tendency to agglomerate, and, thereafter, adding to the reaction mixture, with agitation, a further quantity of said aldehyde and maintaining the reaction mixture under agitation and at a temperature of 40° C.–90° C. until the reaction of condensation between said polyvinyl alcohol and said aldehyde has proceeded to the desired end-point.

11. A polyvinyl butyral resin having the constitution, by weight:

|  | Per cent |
|---|---|
| Polyvinyl alcohol | 15–22 |
| Polyvinyl butyral | 85–77 |
| Polyvinyl acetate | Remainder | said resin being soluble in acetone and insoluble in water and made by the process which comprises adding polyvinyl alcohol in a preponderantly water solution at a temperature of 40° C.–60° C., gradually over a period of at least two minutes and with agitation, to butyraldehyde in the presence of an acid catalyst, at least 0.05 mol of butyraldehyde being present per 1.0 mol of polyvinyl alcohol added, the period during which said polyvinyl alcohol is gradually added, and the agitation given to the reactants being regulated so that the polyvinyl butyral resin formed is precipitated in a finely divided state substantially free of tendency to agglomerate and, thereafter, maintaining the reaction mixture under agitation and at a temperature of 40° C.–60° C. until the reaction of condensation between said polyvinyl alcohol and said butyraldehyde has proceeded to the desired end-point.

GELU STOEFF STAMATOFF.

REFERENCES CITED

The following references are of record in the file of this patent:

UNITED STATES PATENTS

| Number | Name | Date |
|---|---|---|
| 1,955,068 | Hopff | Apr. 17, 1934 |
| 2,122,277 | Bren | June 28, 1938 |
| 2,227,975 | Kenyon | Jan. 7, 1941 |
| 2,253,078 | Lowe | Aug. 19, 1941 |
| 2,120,927 | Blair | June 14, 1938 |
| 2,356,479 | Swan | Aug. 22, 1944 |
| 2,360,308 | Thomas | Oct. 10, 1944 |